(12) United States Patent
Soucy

(10) Patent No.: US 7,643,928 B2
(45) Date of Patent: Jan. 5, 2010

(54) SYSTEM AND METHOD FOR CONTROLLING THE SPEED OF A GAS TURBINE ENGINE

(75) Inventor: Richard Soucy, St-Bruno (CA)

(73) Assignee: Bombardier Transportation GmbH, Berlin (DE)

( * ) Notice: Subject to any disclaimer, the term of this patent is extended or adjusted under 35 U.S.C. 154(b) by 1123 days.

(21) Appl. No.: 10/750,836

(22) Filed: Jan. 5, 2004

(65) Prior Publication Data

US 2005/0147490 A1    Jul. 7, 2005

(51) Int. Cl.
*G06F 19/00* (2006.01)
*G06G 7/70* (2006.01)

(52) U.S. Cl. .................. 701/100; 700/287; 700/290; 290/40 B; 290/40 C; 451/1; 105/35; 105/36

(58) Field of Classification Search ............. 701/19–20, 701/100; 415/1; 455/445; 60/792; 290/40 A, 290/40 C, 40 B; 451/1; 700/287, 290; 82/61; 105/35–36

See application file for complete search history.

(56) References Cited

U.S. PATENT DOCUMENTS

| | | | |
|---|---|---|---|
| 3,520,133 | A | 7/1970 | Loft et al. |
| 3,662,545 | A | 5/1972 | Davis |
| 3,764,814 | A | 10/1973 | Griffith |
| 3,924,140 | A | 12/1975 | Yannone |
| 4,308,463 | A | 12/1981 | Giras et al. |
| 4,414,805 | A * | 11/1983 | Walker .................. 60/792 |
| 4,593,202 | A * | 6/1986 | Dickinson ............... 290/54 |
| 5,252,860 | A | 10/1993 | McCarty et al. |
| 5,321,308 | A | 6/1994 | Johncock |
| 6,169,943 | B1 * | 1/2001 | Simon et al. ............ 701/29 |
| 6,717,285 | B2 * | 4/2004 | Ferraro ................. 290/55 |
| 6,840,048 | B2 * | 1/2005 | Han et al. .............. 60/772 |
| 6,941,217 | B1 * | 9/2005 | Munson, Jr. ........... 701/100 |
| 6,955,052 | B2 * | 10/2005 | Primlani ............... 60/776 |
| 7,571,045 | B2 * | 8/2009 | Muramatsu et al. ..... 701/100 |
| 2004/0060298 | A1 * | 4/2004 | Han et al. .............. 60/772 |
| 2005/0126177 | A1 * | 6/2005 | Primlani ............... 60/776 |

(Continued)

FOREIGN PATENT DOCUMENTS

CA    2454755 A1 *    7/2005

(Continued)

OTHER PUBLICATIONS

IEEE Recommended Practice For Emergency And Standby Power Systems For Industrial And Commercial Applications Jul. 1996 pp. i-310.*

(Continued)

*Primary Examiner*—Cuong H Nguyen

(57) ABSTRACT

A system and method for controlling the speed of a turbine engine, the turbine engine being operative to provide power to a primary load. When a decrease in the power requirement of the primary load is detected, at least a portion of the power generated by the turbine engine is redirected to a secondary load, thereby maintaining the speed of the turbine engine below a rated maximum speed. In the example of a turbine-powered train in which the turbine engine provides power to electric traction motors driving the wheels of the train, when a wheel spin is detected, at least a portion of the power generated by the turbine engine is diverted from the respective electric traction motor to rheostats for conversion to heat.

24 Claims, 5 Drawing Sheets

U.S. PATENT DOCUMENTS

| | | | | |
|---|---|---|---|---|
| 2005/0161275 | A1* | 7/2005 | Serrano et al. | 180/291 |
| 2007/0227118 | A1* | 10/2007 | Hu et al. | 60/39.182 |
| 2008/0148993 | A1* | 6/2008 | Mack | 105/35 |
| 2008/0157529 | A1* | 7/2008 | Rivas et al. | 290/44 |
| 2008/0164698 | A1* | 7/2008 | Habets | 290/44 |
| 2008/0265579 | A1* | 10/2008 | Basteck et al. | 290/52 |
| 2009/0047116 | A1* | 2/2009 | Barbu et al. | 415/1 |
| 2009/0066090 | A1* | 3/2009 | Boone | 290/55 |
| 2009/0074578 | A1* | 3/2009 | Dewar et al. | 416/147 |
| 2009/0145128 | A1* | 6/2009 | Giberson | 60/646 |
| 2009/0197715 | A1* | 8/2009 | Yang | 474/12 |
| 2009/0197716 | A1* | 8/2009 | Yang | 474/12 |

FOREIGN PATENT DOCUMENTS

| | | | |
|---|---|---|---|
| CA | 2455709 | A1 * | 7/2005 |
| DE | 10339427 | A1 * | 3/2005 |
| EP | 1568606 | A2 * | 8/2005 |
| JP | EP000297287 | A1 * | 1/1989 |
| JP | 2004205033 | A * | 7/2004 |
| RU | 2308383 | C1 * | 10/2007 |

OTHER PUBLICATIONS

Propulsion powered electric guns-a comparison of power system architectures; Grater, G.F.; Doyle, T.J.; Magnetics, IEEE Transactions on; vol. 29, Issue 1, Part 2, Jan. 1993 pp. 963-968; Digital Object Identifier 10.1109/20.195709.*

Intelligent Diagnostic Requirements of Future All-Electric Ship Integrated Power System; Logan, K. P.; Industry Applications, IEEE Transactions on; vol. 43, Issue 1, Jan.-Feb. 2007 pp. 139-149; Digital Object Identifier; 10.1109/TIA.2006.886993.*

Intelligent diagnostic requirements of future all-electric ship integrated power system; Logan, K.P.; Petroleum and Chemical Industry Conference, 2005. Industry Applications Society 52nd Annual; Sep. 12-14, 2005 pp.151-163 Digital Object Identifier 10.1109/PCICON.2005.1524551.*

Tighter controls for busier systems [power systems]; Stahlkopf, K.E.; Wilhelm, M.R.; Spectrum, IEEE; vol. 34, Issue 4, Apr. 1997 pp. 48-52; Digital Object Identifier 10.1109/6.583447.*

Servo positioning power tower collectors for solar heat conversion to electricity; Parker, R.S.; Decision and Control including the 15th Symposium on Adaptive Processes, 1976 IEEE Conference on; vol. 15, Part 1, Dec. 1976 pp. 84-89.*

Dynamic Integration of a Grid Connected DFIG Wind Turbine with a Fuel Cell; Palle, Bhaskara; Simoes, Marcelo G.; Industry Applications Conference, 2007. 42nd IAS Annual Meeting. Conference Record of the 2007 IEEE; Sep. 23-27, 2007 pp. 650-655; Digital Object Identifier 10.1109/IAS.2007.103.*

Reconfiguration in Shipboard Power Systems; Davey, Kent; Longoria, Raul; Shutt, William; Carroll, Johnson; Nagaraj, Keerthi; Park, Jerad; Rosenwinkel, Tom; Wu, Wei; Arapostathis, Ari; American Control Conference, 2007. ACC '07; Jul. 9-13, 2007 pp. 4750-4755; Digital Object Identifier 10.1109/ACC.2007.4282807.*

Flywheel energy storage system for electric start and an all-electric ship; McGroarty, J.; Schmeller, J.; Hockney, R.; Polimeno, M.; Electric Ship Technologies Symposium, 2005 IEEE; Jul. 25-27, 2005 pp. 400-406; Digital Object Identifier 10.1109/ESTS.2005.1524706.*

Design and construction of a thermophotovoltaic generator using turbine combustion gas; Erickson, T.A.; Lindler, K.W.; Harper, M.J.; Energy Conversion Engineering Conference, 1997. IECEC-97. Proceedings of the 32nd Intersociety; Jul. 27-Aug. 1, 1997 pp. 1101-1106 vol. 2; Digital Object Identifier 10.1109/IECEC.1997.661924.*

Influences of dispersed generation on the performance of the electricity grid; Freij, P.A.J.; Cobben, J.F.G.; Sloot, J.G.J.; Kling, W.L.; Universities Power Engineering Conference, 2004. UPEC 2004. 39th International; vol. 3, Sep. 6-8, 2004 pp. 978-982 vol. 2.*

Gasparovic, "Gas Turbine Cycle Operating Partly at Sub-Atm. Press.", Nav. Eng. J., Dec. 1974, pp. 81-90; cited by others.*

Advanced Turbine Technology Applications Project (ATTAP) 1994 Annual Report; AS Engines, A Phoenix, UCN DEN—osti.gov, publication date: Jun. 1, 1995; from http://www.osti.gov/energycitations/product.biblio.jsp?osti_id=258095.*

ICARUS: design and deployment of a case-based reasoning system for locomotive diagnostics; Anil Varma et al.,Information Technology Laboratory, General Electric Corporate Research and Development, PO Box 8, Schenectady, Niskayuna, NY 12301, USA; from Engineering Applications of Artificial Intelligence vol. 12, Issue 6, Dec. 1999, pp. 681-690.*

* cited by examiner

SYSTEM AND METHOD FOR CONTROLLING THE SPEED OF A GAS TURBINE ENGINE

FIELD OF THE INVENTION

The present invention relates generally to the field of combustion turbines. More specifically, the present invention relates to a novel system and method for controlling the speed of a gas turbine engine during load transients. Although the present invention may find particular utility in the field of turbine-powered trains, and will be described in relation to such equipment, the invention can also be applied to combustion turbines having other uses.

BACKGROUND OF THE INVENTION

In recent years, a sleeker and more lightweight train has become popular, notably the turbine-powered train. The turbine-powered train is conceived on aerodynamic principles and is powered by an aircraft-type gas turbine engine, making it lighter, faster and quieter than conventional trains.

In a modern gas turbine engine, the engine produces its own pressurized gas, and does this by burning a fuel. The heat that comes from burning the fuel expands air, and the high-speed rush of this hot air spins the turbine. A simple gas turbine engine has a compressor, a combustor and a turbine. A rotating compressor draws in air from the atmosphere, pressurizes it, and forces it into the combustor (i.e. the furnace) in a steady flow. Fuel, such as oil, natural gas or pulverized coal, is forced into the air and burns, raising the temperature of the mixture of air and combustion products, thereby increasing the heat energy. This high-energy mixture then flows through the turbine, dropping in pressure and temperature as it drives the moving blades and develops mechanical energy. The spent gases then leave at atmospheric pressure but at high temperature. The turbine drives the compressor rotor through a shaft and also an external load through the load coupling.

Train accessories may be driven mechanically by an accessory drive shaft and gearbox connected directly to the turbine shaft. The mechanical connection from the turbine shaft may be through an engine-mounted gearbox or through a power takeoff shaft to a remotely mounted gearbox. Examples of such train accessories include: tachometers, generators (alternators), hydraulic pumps, fuel pumps, oil pumps, fuel controls, starters, etc.

Typically, the turbine engine turns a high-speed generator, producing electricity. Power from the generator is then provided to one or more variable-speed electric motors, which drive the wheels of the train. When the train is in motion, various different unpredictable situations may cause load transients to be experienced by the turbine engine, for example wheel slip or emergency breaking.

As is well known, in cases where the turbine engine sees its load decrease significantly, the turbine engine will have a tendency to speed up and may reach speeds in excess of the rated maximum speed for the engine (commonly referred to as overspeed mode). This overspeed mode is undesirable since it can be damaging to the turbine engine, which operates most efficiently for a constant rather than a fluctuating load.

In existing turbine-powered trains, a common solution to a detected overspeed mode is to shut-off the turbine engine, after which the turbine engine has to be re-started. Unfortunately, repeated shutting off and re-starting of a turbine engine inevitably causes wear to the turbine engine, thus reducing the active lifetime of the turbine engine. Furthermore, since it can take several seconds to re-start a turbine engine, having to re-start the turbine engine each time a severe wheel slip occurs may prove to be quite impractical, especially when the track conditions are such that such wheel slips occur repeatedly and at short intervals.

In another solution, the fuel delivery to the turbine engine is controlled, whereby this fuel delivery is decreased or completely halted upon detection of a significant load decrease, for preventing over-revving of the turbine engine. Unfortunately, because of the risk of surge of the turbine compressor, a time lag must exist between detection of the load transient and the decrease in fuel delivery to the turbine engine, and the turbine engine may still increase in speed during this time lag. Furthermore, controlling the fuel delivery to the turbine engine does not prevent having to repeatedly decrease and increase the speed of the turbine engine, which will inevitably cause more wear to the turbine engine than maintaining the turbine engine at a constant speed.

In light of the foregoing, a need clearly exists in the industry for an improved system and method for controlling the speed of a turbine gas engine during load transients.

SUMMARY OF THE INVENTION

As embodied and broadly described herein, the present invention is directed to a system and method for controlling the speed of a turbine engine.

In a broad aspect, the invention provides a method for controlling the speed of a turbine engine, the turbine engine being operative to provide power to a primary load.

When a decrease in the power requirement of the primary load is detected, at least a portion of the power generated by the turbine engine is redirected to a secondary load, thereby maintaining the speed of the turbine engine below a rated maximum speed.

In another broad aspect, the invention provides a system for controlling the speed of a turbine engine providing power to a primary load. The system is operative to maintain the speed of the turbine engine below a rated maximum speed, by applying a secondary load to the turbine engine when a decrease in the power requirement of the primary load is detected.

In yet another broad aspect, the invention provides a system for controlling the speed of a turbine engine operative to provide power to a primary load. The system includes a controller unit capable to detect a decrease in load demand on the turbine engine by the primary load. The controller unit is responsive to this decrease in the load demand on the turbine engine by the primary load to cause a secondary load to apply a respective load demand on the turbine engine.

In a specific, non-limiting example of implementation of the present invention, the novel method and system is implemented onboard a turbine-powered train, the turbine engine providing power to electric traction motors driving the wheels of the train. When a wheel spin is detected, at least a portion of the power generated by the turbine engine is diverted from the respective electric traction motor to rheostats for conversion to heat, such that a substantially constant load is maintained on the turbine engine.

BRIEF DESCRIPTION OF THE DRAWINGS

A detailed description of examples of implementation of the present invention is provided hereinbelow with reference to the following drawings, in which.

Figure 1:
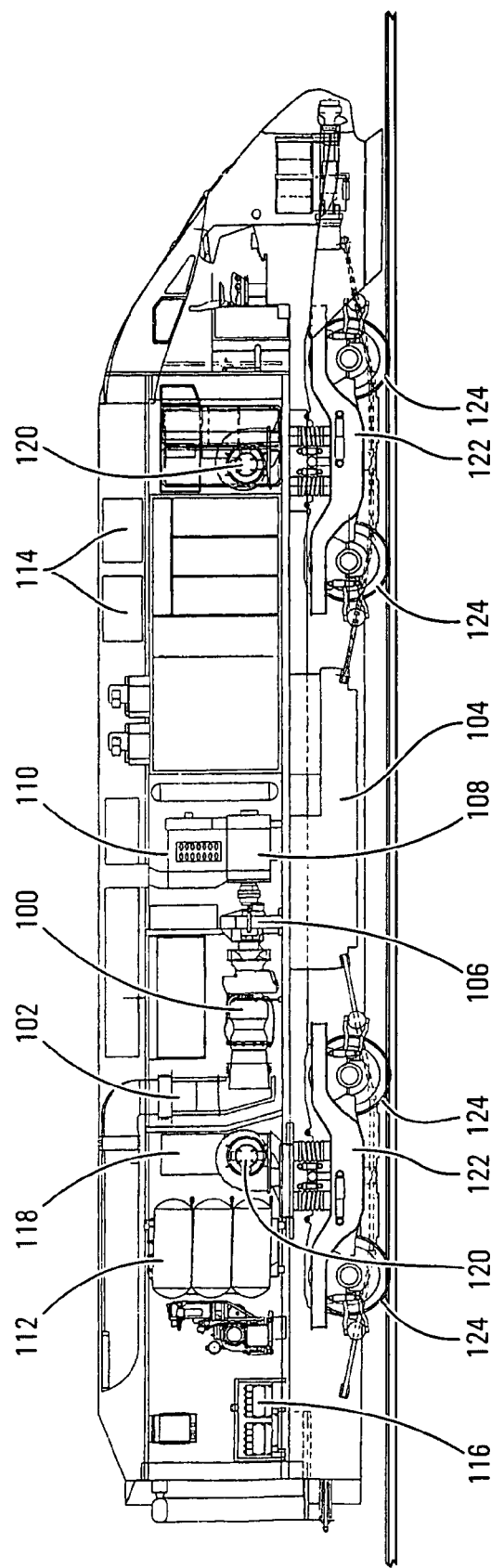
FIG. 1 is a side plan view of an example of the general arrangement of the locomotive of a turbine-powered train.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION

A novel system and method for controlling the speed of a gas turbine engine is described herein, particularly for use in controlling engine speed during load transients. Before describing the particular features of the present invention, consider first an overall description of the operating environment for the invention, namely a turbine-powered train. Although the invention is set forth in relation to turbine-powered trains, it should be understood that the invention has a wider range of application.

FIG. 1 depicts a side plan view of an example of the general arrangement of the locomotive railcar of a turbine-powered train. The locomotive railcar carries various different pieces of equipment and machinery assemblies, including: a gas turbine engine 100, a turbine exhaust duct 102, a fuel tank 104, a gearbox 106, alternators 108, an alternator blower 110, air reservoirs 112, rheostatic grids 114, batteries 116, turbine power and controls 118, traction motors (not shown), traction blowers 120 and pneumatic brake controls (not shown), among others. Note that the traction motors are not seen in the side plan view of FIG. 1 because they are hidden behind bogey frames 122. Similarly, the pneumatic brake controls are hidden behind the air reservoirs 112.

In use, the turbine engine 100 drives alternators 108 in order to produce electricity for the various equipment and assemblies of the locomotive railcar, including in particular the electric traction motors that drive the wheels 124 of the locomotive railcar for moving the train along the tracks.

Figure 2:
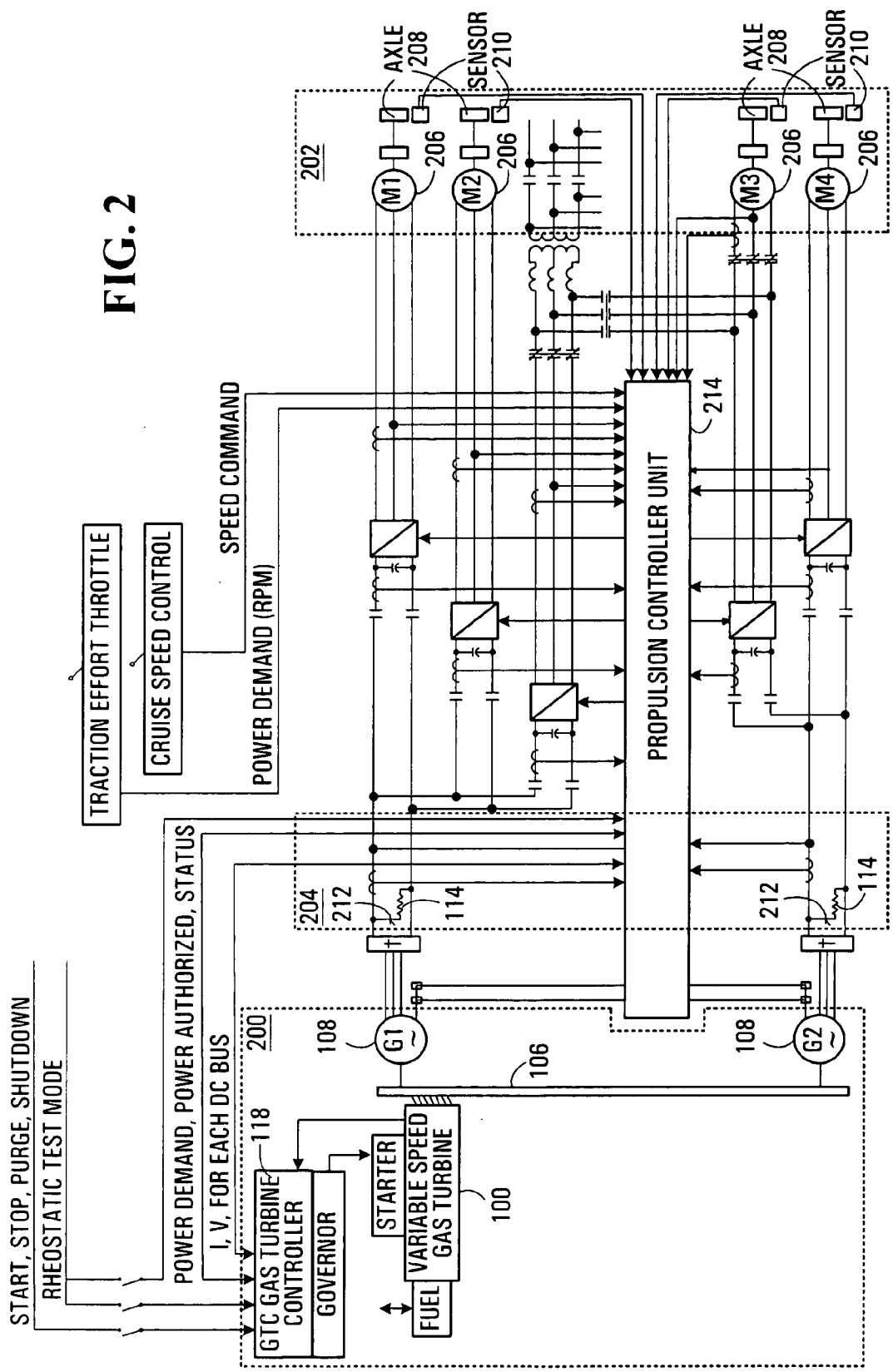
FIG. 2 is a system-level view of the locomotive of FIG. 1, in accordance with an embodiment of the present invention.
Figure 3:
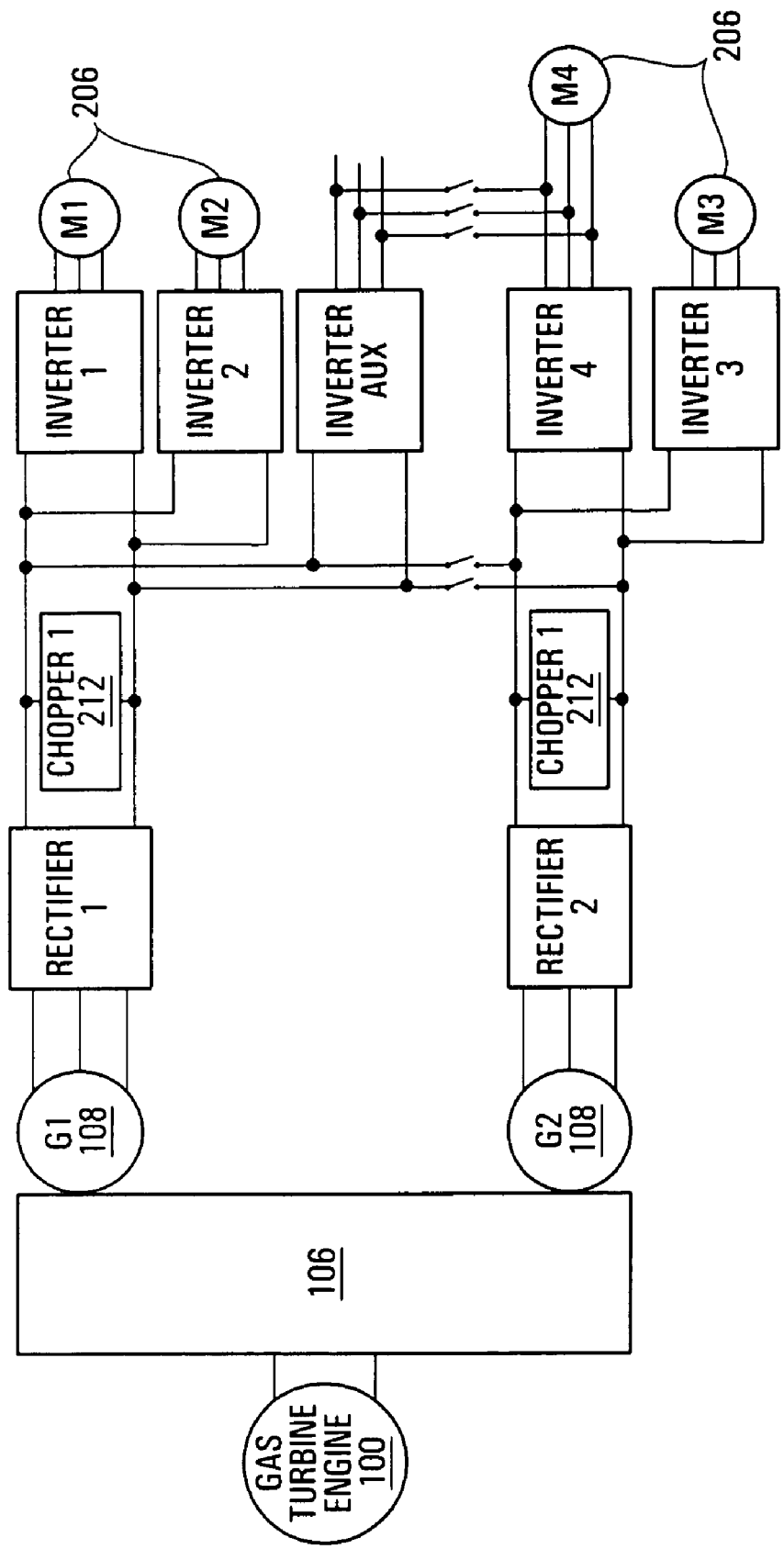
FIG. 3 is a block diagram of a simplified control circuit corresponding to the system-level arrangement shown in FIG. 2.

FIG. 2 illustrates a system-level block diagram of the locomotive railcar, specifically the power generation 200, propulsion 202 and electric braking 204 systems of the locomotive, in accordance with an embodiment of the present invention. FIG. 3 is a block diagram of a simplified control circuit corresponding to the system-level arrangement shown in FIG. 2.

The power generation system 200 includes but is not limited to the gas turbine engine 100, the turbine controller 118, the gearbox 106 and the alternators 108. Together, these components operate to generate electrical energy for powering the locomotive, and thus the train. Since such a power generation system has been well documented and is well known to those skilled in the art, its structure and functionality will not be described in any further detail.

The propulsion system 202 includes but is not limited to several electric traction motors 206. Each electric traction motor 206 is connected via a shaft to the gearbox of a respective axle 208, which has a gear train that rides on the axle 208 itself and transfers power to a respective pair of wheels 124 of the locomotive. A sensor 210 continuously monitors both the speed of the respective traction motor 206 and the current drawn thereby, as will be discussed in further detail below. Since such a propulsion system has been well documented and is well known to those skilled in the art, its structure and functionality will not be described in any further detail.

In the example of FIGS. 2 and 3, the propulsion system 202 has four traction motors 206 for controlling the wheels 124 of the train. However, the propulsion system 202 may be provided with more or less electric traction motors 206 without departing from the scope of the present invention.

When the train is in motion, the group of electric traction motors 206 form a primary load for the turbine engine 100, which must generate enough power to be able to meet the power requirements of each one of the traction motors 206. The power requirement of a particular traction motor 206 corresponds to an amount of current required by the particular traction motor 206 in order to be able to generate sufficient torque for driving the respective wheels 124 of the train.

The braking system 204 includes but is not limited to the rheostatic grids 114, which are large, air-cooled resistors, located on the roof of the locomotive railcar, used to dissipate braking power generated by the traction motors 206 while braking. Although each traction motor 206 drives and accelerates the train, during braking it acts as an electric generator instead, forming part of a circuit that consists of a main resistor (rheostat 114), armatures and a field system. Electricity flows through the circuit and is consumed by the rheostat 114, which converts the kinetic energy of the train into heat and thereby acts as a brake. Rheostatic brakes, also known as dynamic brakes, are commonly used on high-speed trains to absorb braking energy for stopping the train from full speed or for reducing the speed of the train. A chopper 212 is associated with each rheostat 114, and acts as a switch in that it is operative to interrupt electric current at short regular intervals. In a specific example, the choppers 212 are implemented by Insulated Gate Bi-polar Transistor (IGBT) switches. Thus, each chopper 212 is used to modulate the effective resistance of each respective rheostat 114 for varying the braking effort by the rheostat 114. Since such a braking system has been well documented and is well known to those skilled in the art, its structure and functionality will not be described in any further detail.

In the example of FIGS. 2 and 3, two rheostatic grid 114 and chopper 212 assemblies are provided, each one being connected to a respective pair of traction motors 206 via a DC bus, for use during braking of the train. Note that the braking system 204 may include more or less rheostatic grid 114 and chopper 212 assemblies, without departing from the scope of the present invention.

A propulsion controller unit 214 implements control logic, and exchanges and monitors signals over various different DC buses. These DC buses connect the various components of the power generation system 200, propulsion system 202 and electric braking system 204, and allow the propulsion controller unit 214 to control the driving and braking operation of the train. In a specific example, the propulsion controller unit 214 is implemented in software, as a central processing unit. Alternatively, the propulsion controller unit 214 may be implemented in hardware. The functionality of such a locomotive controller unit is also well known to those skilled in the art and, as such, will not be described in detail.

Specific to the present invention, the propulsion controller unit 214 is operative to control the speed of the turbine engine 100 during transients in the primary load applied thereto. More specifically, the propulsion controller unit 214 implements a mechanism for maintaining the speed of the turbine engine 100 below a rated maximum speed during periods of sudden decrease in the power requirement of one or more of the electric traction motors 206.

Note that the rated maximum speed of the turbine engine 100 is predetermined in accordance with the specifications of the particular turbine engine 100 model, and corresponds to the speed at or above which the turbine engine 100 must be shut-down in order to avoid damage to the turbine engine 100.

Typically, a decrease in the power requirement of a traction motor 206 occurs as a result of either a wheel spin, in which case the load on the traction motor 206 itself significantly decreases, or as a result of emergency braking of the train. In either case, the traction motor 206 requires less current for operation, and the effective primary load applied to the turbine engine 100 decreases.

Upon detecting such a decrease in the power requirement of one or more of the traction motors 206, the propulsion controller unit 214 is operative to redirect at least a portion of the power generated by the turbine engine 100 to a secondary load, distinct from the traction motors 206. The selection of the secondary load, in terms of the size and thus power requirements thereof, is determined by the propulsion controller unit 214 such as to maintain the total load applied to the turbine engine 100 substantially constant.

Advantageously, since the turbine engine 100 detects a more or less constant load, even during periods of decreased power requests from one or more of the traction motors 206, the speed of the turbine engine 100 remains below the rated maximum speed of the turbine engine 100. As a result, the turbine engine 100 does not have to be shut off and restarted, thus preventing wear to the turbine engine 100.

Alternatively, the selection of the secondary load is determined by the propulsion controller unit 214 such as to maintain the total load applied to the turbine engine 100 within a predetermined tolerance range. In a specific example, the propulsion controller unit 214 is operative to ensure that the total load applied to the turbine engine 100 is never more than 20% less than the primary load normally applied by the traction motors 206. Note that this tolerance range is predetermined in accordance with the specifications of the particular turbine engine 100 model, and corresponds to the variation in load that the turbine engine 100 can tolerate while still maintaining its speed below the rated maximum speed.

The amount of power drawn by the secondary load applied to the turbine engine 100 by the propulsion controller unit 214 is proportional to the decrease in power required by the one or more traction motors 206. In a specific example, the amount of power drawn by the secondary load is equal to the decrease in power required by the one or more traction motors 206, such that the speed of the turbine engine 100 remains substantially constant during operation of the train.

The secondary load may be implemented by any piece of equipment of the locomotive that is independent from the electrical traction motors 206 and that either requires electrical power for operation or can dissipate or accumulate such power. Examples of locomotive equipment that may serve as the secondary load include batteries, accumulators, condensators and a flywheel, among many other possibilities.

In the specific, non-limiting example shown in FIG. 2, the secondary load is implemented by the rheostatic grids 114 of the locomotive. Thus, when the propulsion controller unit 214 detects a decrease in the power requirements of one or more of the traction motors 206, the propulsion controller unit 214 will redirect at least a portion of the power generated by the turbine engine 100 to the rheostatic grids 114, which will convert this energy into heat.

Figure 4:
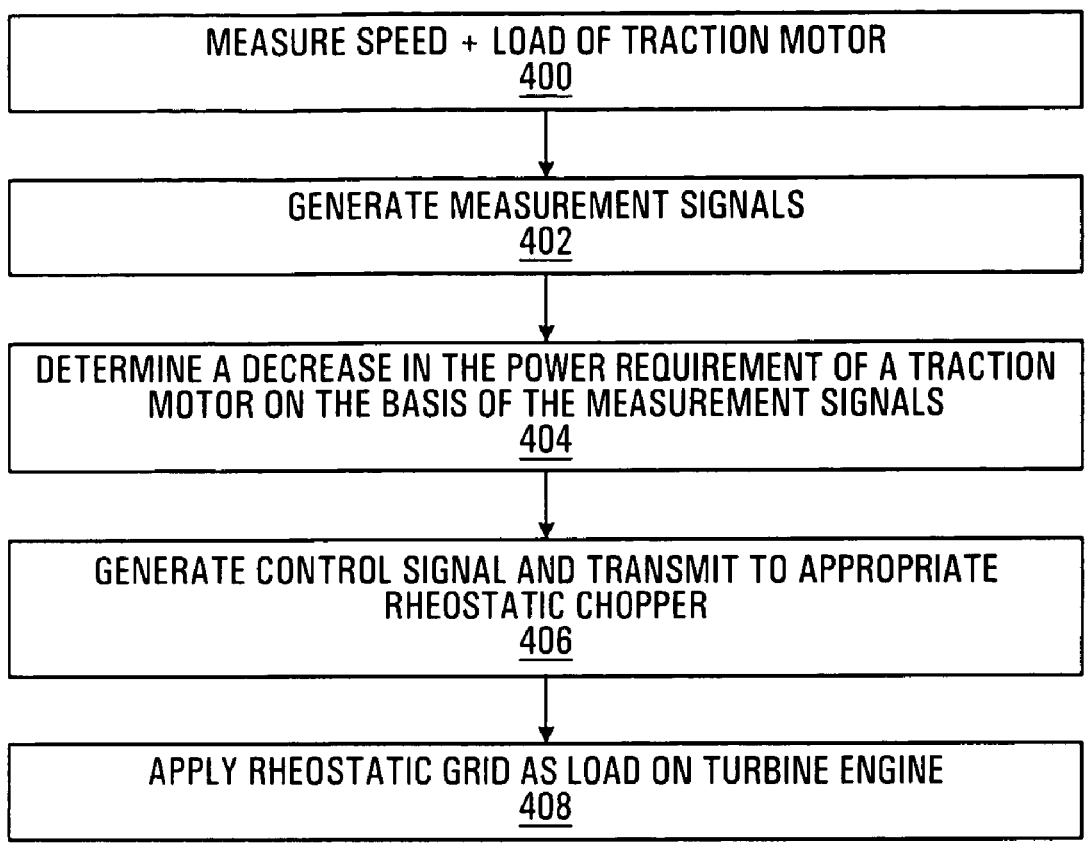
FIG. 4 is a flowchart depicting a method for controlling the speed of the turbine engine shown in FIGS. 1-3, in accordance with an example of implementation of the present invention.

In a specific, non-limiting example of implementation of the present invention, the propulsion controller unit 214 implements the mechanism described above on the basis of measurement signals received from a sensor unit, the latter regrouping the sensors 210 seen in FIG. 2. With reference to the flowchart of FIG. 4, at step 400 each sensor 210 determines the speed and the load of the respective traction motor 206 by measuring its rotor speed and stator current. On the basis of the measured rotor speed and stator current, the sensor 210 next generates one or more measurement signals and transmits these measurement signals to the propulsion controller unit 214 at step 402. From the measurement signals, the propulsion controller unit 214 can determine the acceleration of each traction motor 206, as well as the power drawn thereby.

In a specific example, the measurement signals are indicative of a sudden variation in the speed of the axle 208. This speed variation may be caused by a wheel slip while braking, resulting in a decrease of the braking power generated by the corresponding traction motor 206. Alternatively, the speed variation may be caused by wheel spin occurring while cruising or accelerating, resulting in a decrease of the power drawn by the respective traction motor 206. The speed variation may also be caused by emergency braking, resulting in a sudden decrease of power drawn by all traction motors 206. In each case, one or more measurement signals sent by the sensors 210 to the propulsion controller unit 214 indicate that a sudden drop in the load of one or more traction motors 206 has occurred. Thus, at step 404, the propulsion controller unit 214 determines a decrease in the power requirement of one or more of the traction motors 206 on the basis of the measurement signals received from the sensors 210.

When the propulsion controller unit 214 detects a decrease in the power requirement of a particular traction motor 206, the propulsion controller unit 214 generates a control signal and transmits this control signal to the appropriate rheostatic chopper 212 at step 406.

Note that the propulsion controller unit 214 is capable to determine the appropriate rheostatic chopper 212 on the basis of the particular DC bus over which the drop in traction motor load occurs. Thus, in the example of FIGS. 2 and 3, when a decrease in power requirement is detected for one or both traction motors 126 of a particular pair of traction motors 126, the respective one of the two rheostatic grid 114 and chopper 212 assemblies will be used. Alternatively, when a decrease in power requirement is detected for both pairs of traction motors 126, both rheostatic grid 114 and chopper 212 assemblies will be used.

At step 408, the rheostatic chopper 212 is responsive to the control signal received from the propulsion controller unit 214 to apply the respective rheostatic grid 114 as a load on the turbine engine 100, thereby drawing at least a portion of the energy of the turbine engine 100 to the rheostatic grid 114 for conversion to heat.

Since each rheostatic grid 114 is driven by a chopper 212, and this chopper 212 is responsive to control signals received from the propulsion controller unit 214 to modulate the effective resistance of the respective rheostatic grid 114 accordingly, the propulsion controller unit 214 is able to control the power level of the rheostatic grids 114. More specifically, the propulsion controller unit 214 is operative to continuously set the power level of each rheostatic grid 114, which may vary from 0 to 100%, on the basis of the decrease in power requirement detected at step 404. Thus, the propulsion controller unit 214 uses the power requirement of the rheostatic grids 114 to compensate for the decreased power requirement of the one or more traction motors 206, thereby ensuring that a relatively constant load is maintained on the turbine engine 100.

Note that the power level of a particular rheostatic grid 114 corresponds to the amount of power drawn from the turbine engine 100 by the particular rheostatic grid 114.

In the specific example where the choppers 212 are implemented by IGBT switches, the amount of power drawn by each rheostatic grid 114 is modulated using a Pulse Width Modulation (PWM) method. As is well known to those skilled in the art, the IGBT switch opens and closes hundreds of times per second, for example 500 times per second. depending on the ratio of time during which the switch is closed to time during which the switch is open, the power level of the associated rheostatic grid 114 can be accurately modulated. Specific to the present invention, the propulsion controller unit 214 is operative to set this ratio for each IGBT switch, via the control signals generated at step 406, thereby controlling the power level of the rheostatic grids 114 as applied to the turbine engine 100.

The signaling by the propulsion controller unit 214 of a rheostatic chopper 212 to apply the respective rheostatic grid 114 as a load on the turbine engine 100 can be effected within a short delay period, for example 0.25 seconds. Consequently, the drop in load caused by the reduced power requirement of a traction motor 206 will go undetected by the turbine engine 100.

Note that when one or more rheostatic grids 114 is applied as a load on the turbine engine 100 and the propulsion controller unit 214 detects a rise in the power requirement of a traction motor 206, the propulsion controller unit 214 is operative to control the rheostatic choppers 212 such that the load applied by the rheostatic grids 114 to the turbine engine 100 is gradually decreased.

In a variant example of implementation of the present invention, the propulsion controller unit 214 is operative to detect a decrease in the power requirement of a traction motor 206 by monitoring the power on the DC buses which carry current to and from the traction motors 206. If the power on a particular bus falls below a certain power threshold, the difference between the measured power on the particular bus and the power threshold is compensated by applying at least one rheostat 114 as load to the turbine engine 100, through modulation of the respective chopper 212. Thus, by maintaining a minimum power level on each bus, the propulsion controller unit 214 is operative to ensure that the speed of the turbine engine 100 never exceeds its rated maximum speed.

Figure 5:
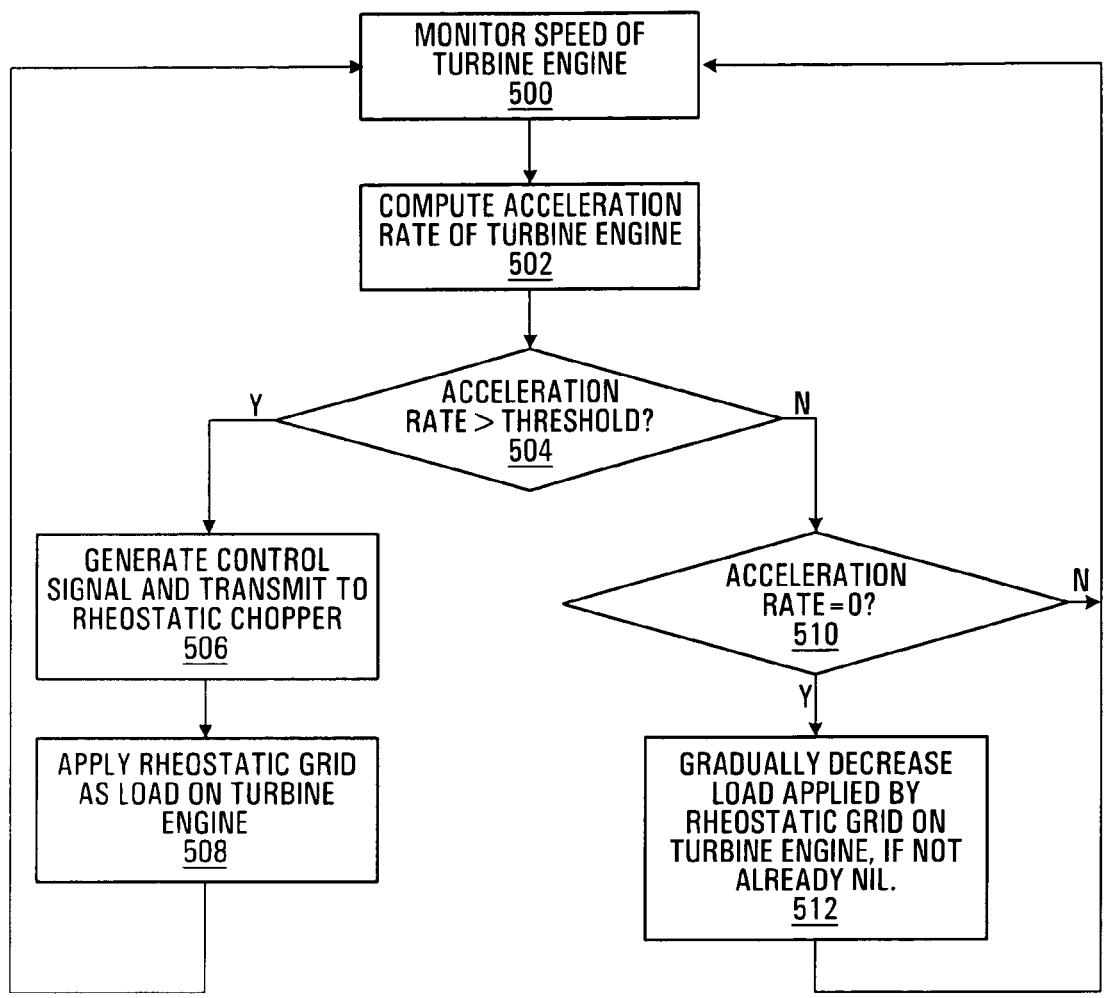
FIG. 5 is a flowchart depicting a method for controlling the speed of the turbine engine shown in FIGS. 1-3, in accordance with a variant example of implementation of the present invention.

In another variant example of implementation of the present invention, the propulsion controller unit 214 implements the mechanism described above on the basis of the computed acceleration rate of the turbine engine 100, as detailed in the flowchart shown in FIG. 5. At step 500, the propulsion controller unit 214 monitors the speed of the turbine engine 100, via sensors not shown in FIGS. 2 and 3. These sensors take repeated measurements of the speed of the turbine engine 100, and transmit these measurements to the propulsion controller unit 214. In a specific example, each sensor takes 100 measurements per second of the speed of the turbine engine 100. On the basis of these measurements of the speed of the turbine engine 100, the propulsion controller unit 214 is able to compute the acceleration rate of the turbine engine 100 at step 502. At step 504, the computed acceleration rate is compared to a predetermined threshold. If the computed acceleration rate is above the predetermined threshold, the propulsion controller unit 214 generates a control signal and transmits this control signal to at least one of the rheostatic choppers 212 at step 506. Each rheostatic chopper 212 is responsive to this control signal to apply the respective rheostatic grid 114 as a load on the turbine engine 100 at step 508, thereby drawing at least a portion of the energy of the turbine engine 100 to the rheostatic grid 114 for conversion to heat.

Alternatively, at step 504, the propulsion controller unit 214 also checks to see whether the speed of the turbine engine 100 is above a predetermined value. Only if the computed acceleration rate is above the predetermined threshold and the speed of the turbine engine is above the predetermined value will the propulsion controller unit 214 cause the rheostatic grids 114 to be applied as a load on the turbine engine 100. In a specific example, this predetermined value of the speed of the turbine engine 100 is 103% of the rated nominal speed of the turbine engine 100.

Prior to transmitting the control signal to the rheostatic choppers 212 at step 506, the propulsion controller unit 214 is operative to consult a predefined look-up table on the basis of the acceleration rate computed at step 502, in order to determine the amount of load to be applied by the rheostatic grids 114. The greater the computed acceleration rate, the greater the load required to be applied by the rheostatic grids 114. The predefined look-up table maps each different acceleration rate of the turbine engine 100 to a different amount of power required to keep the speed of the turbine engine 100 below the rated maximum speed. Once the required amount of power is revealed by the look-up table, the propulsion controller unit 214 is capable to determine the amount of load to be applied in rheostatic grids 114, since each rheostatic grid 114 is continuously adjustable up to its maximum power level.

Note that, when the propulsion controller unit 214 computes an acceleration rate of zero for the turbine engine 100, which indicates that the speed of the turbine engine 100 is constant, the propulsion controller unit 214 is operative to control the rheostatic choppers 212 such that the load applied by the rheostatic grids 114 to the turbine engine 100 is gradually decreased.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A system for controlling the speed of a turbine engine powering a rail vehicle, the turbine engine being operative to provide power to a traction motor driving at least one wheel of the rail vehicle, said system comprising: a sensor unit for monitoring the operation of the traction motor; a controller unit coupled to said sensor unit, said controller unit operative for detecting a sudden decrease in the power requirement of the traction motor on the basis of signals received from said sensor unit, said controller unit being responsive to said sudden decrease in the power requirement of the traction motor to generate a control signal for causing at least a portion of the power generated by the turbine engine to be redirected to a secondary load.

2. A system as defined in claim 1, wherein said secondary load includes at least one rheostatic grid of the rail vehicle.

3. A system for controlling the speed of a turbine engine on a rail vehicle, the turbine engine providing power to a primary electric load of the rail vehicle, said system comprising: a sensor for monitoring the speed of the turbine engine; a controller unit coupled to said sensor, said controller unit operative to compute the acceleration rate of the turbine engine; if the acceleration rate of the turbine engine is above a predetermined threshold, said controller unit being further operative to generate a control signal for causing a secondary load to be applied to the turbine engine such as to maintain the speed of the turbine engine below a rated maximum speed.

4. A system as defined in claim 3, wherein said controller unit generates said control signal only when the speed of the turbine engine is above a predetermined value.

5. A system for controlling the speed of a turbine engine of a rail vehicle, the turbine engine providing power to a primary electric load of the rail vehicle, said system comprising: a controller unit capable to detect a decrease in load demand on the turbine engine by the primary load; a secondary electric load selectively connectable to the turbine engine, said controller unit being responsive to said decrease in load demand on the turbine engine by the primary load to cause said secondary electric load to apply a respective load demand on the turbine engine proportional to said decrease in load demand by the primary electric load.

6. A system as defined in claim 5, wherein said controller unit controls the load demand applied by said secondary electric load to the turbine engine such that, as the load demand applied by the primary electric load to the turbine engine varies, the sum of the load demands applied to the turbine engine by the primary and secondary electric loads remains substantially constant.

7. A system as defined in claim 5, wherein said controller unit controls the load demand applied by said secondary electric load to the turbine engine such that, as the load demand applied by the primary electric load to the turbine engine varies, the sum of the load demands applied to the turbine engine by the primary and secondary electric loads remains within a predetermined tolerance range.

8. A system for controlling the speed of a turbine engine of a rail vehicle, the turbine engine providing power to a primary load of the rail vehicle, said system being operative to maintain the speed of the turbine engine below a rated maximum speed by applying a secondary load to the turbine engine when a decrease in a power requirement of the primary load is detected.

9. A system for controlling the speed of a turbine engine of a rail vehicle, turbine engine being operative to provide power to a primary load of the rail vehicle, said system comprising: a controller unit capable to detect a decrease in load demand on the turbine engine by the primary load, said controller unit being responsive to said decrease in load demand on the turbine engine by the primary load to cause a secondary load to apply a respective load demand on the turbine engine.

10. A system as defined in claim 9, wherein said controller unit is operative to detect a decrease in load demand on the turbine engine by the primary load on the basis of the speed of the turbine engine.

11. A system as defined in claim 10, further comprising a sensor unit for measuring the speed of the turbine engine, said controller unit being operative for detecting a decrease in load demand on the turbine engine by the primary load on the basis of signals received from said sensor unit.

12. A system as defined in claim 11, wherein said controller unit is operative to compute an acceleration rate of the turbine engine on the basis of signals received from said sensor unit, said controller unit detecting a decrease in the load demand on the turbine engine by the primary electric load when the acceleration rate of the turbine engine surpasses a predetermined threshold.

13. A system as defined in claim 12, wherein, if the acceleration rate of the turbine engine is above the predetermined threshold, said controller unit is operative to cause the secondary load to apply its respective load demand on the turbine engine for utilizing at least a portion of the power generated by the turbine engine.

14. A system as defined in claim 12, wherein if the acceleration rate of the turbine engine is above the predetermined threshold and the speed of the turbine engine is above a predetermined value, said controller unit is operative to cause the secondary load to apply its respective load demand on the turbine engine for utilizing at least a portion of the power generated by the turbine engine.

15. A system as defined in claim 9, wherein said controller unit is responsive to said decrease in load demand on the turbine engine by the primary load to generate a control signal for causing the secondary load to apply the respective load demand on the turbine engine.

16. A system as defined in claim 9, wherein the load demand applied by the secondary load on the turbine engine is proportional to said decrease in load demand by the primary load.

17. A system as defined in claim 9, wherein said controller unit is operative to ensure that a substantially constant load demand is maintained on the turbine engine.

18. A system as defined in claim 9, wherein said controller unit is operative to detect a decrease in load demand on the turbine engine by the primary load on the basis of at least one parameter of the primary load.

19. A system as defined in claim 18, further comprising a sensor unit for monitoring operation of the primary load, said controller unit being operative for detecting a decrease in load demand on the turbine engine by the primary load on the basis of signals received from said sensor unit.

20. A system as defined in claim 19, wherein the primary load is an electric motor, said sensor unit being operative to measure a speed of the electric motor.

21. A system as defined in claim 20, wherein said sensor unit is further operative to measure the load of the electric motor.

22. A system as defined in claim 20, wherein said signals are indicative of the speed of the electric motor.

23. A system as defined in claim 21, wherein said signals are indicative of the speed and the load of the electric motor.

24. A system as defined in claim 9, wherein said controller unit is operative to ensure that a total load demand on the turbine engine is maintained within a predetermined tolerance range.

* * * * *

UNITED STATES PATENT AND TRADEMARK OFFICE
CERTIFICATE OF CORRECTION

PATENT NO.       : 7,643,928 B2                                Page 1 of 1
APPLICATION NO. : 10/750836
DATED            : January 5, 2010
INVENTOR(S)      : Richard Soucy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1713 days.

Signed and Sealed this

Sixteenth Day of November, 2010

David J. Kappos
*Director of the United States Patent and Trademark Office*